April 28, 1959 F. W. SCHOR 2,884,481

SYNCHRONIZING CIRCUIT FOR COLOR TELEVISION RECEIVERS

Filed Nov. 1, 1954 2 Sheets-Sheet 1

INVENTOR.
FERDINAND W. SCHOR

BY

Ostrolenk & Faber

ATTORNEYS

SYNCHRONIZING CIRCUIT FOR COLOR TELEVISION RECEIVERS

Filed Nov. 1, 1954 2 Sheets-Sheet 2

INVENTOR.
FERDINAND W. SCHOR

BY

Ostrolenk & Faber

ATTORNEYS

United States Patent Office 2,884,481

Patented Apr. 28, 1959

2,884,481

SYNCHRONIZING CIRCUIT FOR COLOR TELEVISION RECEIVERS

Ferdinand W. Schor, La Canada, Calif., assignor to Standard Coil Products Co., Inc., Los Angeles, Calif., a corporation of Illinois Application November 1, 1954, Serial No. 465,980

9 Claims. (Cl. 178—5.4)

The present invention relates to a color television system and more particularly relates to means for synchronizing a receiver oscillator with a transmitting signal.

In black and white television, the video modulation signal contains three main parts, the video information signal, the horizontal synchronization and blanking signals at 15,750 cycles and the vertical synchronization and blanking signals at 60 cycles.

In transmission of color, the different colors are obtained by mixing red, green and blue light in what is known as an additive process. The color television signal in order to provide information for the reproduction of the color image must be composed of two main parts, a black and white or brightness part and a color part, the former referred to as the luminance portion of the signal and the second as the chrominance portion of the signal so that if the black and white luminance portion is transmitted separately from the color portion, then a black and white receiver can utilize and reproduce this portion and discard the color portion.

A color television receiver, on the other hand, can recombine the brightness portion with the color portion and reproduce, therefore, the original color image. This monochrome or brightness portion of the signal is referred to as a Y signal when the color camera voltages are combined to produce an equivalent monochrome signal through proper proportioning of the three primary colors, red, green and blue.

The color signal in one system adopted by the National Television System Committee consists of two signals, so-called I and Q signals. In the color receiver, the Y, I and Q signals are combined to reproduce the desired color image. This is obtained essentially by reproducing the original red, green and blue color signals and by applying these color signals to the color picture tube.

At the transmitter, the I and Q signals obtained through a matrix from the red, green and blue colors of the color image are used to modulate a picture carrier 3.58 megacycles away from the Y or video carrier. More specifically, each of the I and Q signals is transmitted by amplitude modulation of two carriers, each of which are at the same frequency of 3.58 megacycles but in quadrature with respect to each other. In the actual transmission, the two quadrature components are combined resulting in a combination of phase and amplitude modulation of the 3.58 megacycles carrier.

At the receiver, the carrier is detected by two quadrature components of the locally generated 3.58 megacycle oscillator so that the amplitude variations of the two components I and Q can now be recovered at the receiver. As previously mentioned, these I and Q signals are then combined with the black and white information to yield the proper amplitude of red, green and blue information which is then applied to the grids of the red, blue, green gun of the picture tube if a three gun picture tube is used. In such a system, it is of great importance for the locally generated 3.58 megacycle carrier to be at the same frequency and phase as the transmitter carrier since otherwise the proper hue cannot be recovered and one of the basic problems of color television receivers is to be capable of generating and maintaining the proper synchronism between the locally generating 3.58 megacycle carrier and the transmitter carrier.

In the color transmitter signal, there appears on the back porch of the horizontal synchronizing pulse a color burst consisting of 8 to 10 cycles of the transmitter carrier frequency. This short burst is actually a small part of the 3.58 megacycle transmitter color carrier which is thus made available for synchronizing the locally generated color carrier at the receiver. In fact, the color burst of 8 to 10 cycles at 3.58 megacycles is used to generate local oscillations in synchronism with the color carrier.

Up to the present time, the synchronization between the locally generated color carrier and the transmitter color carrier through utilization of these 8 to 10 cycles of color burst was obtained by first feeding through a tuned circuit a burst amplifier feeding into a phase discriminating transformer and thence into a phase detector. At the same time, a 3.58 megacycle oscillator is controlled by a crystal and in shunt with the crystal by a reactance tube. The output from this crystal controlled oscillator is fed into a color phasing amplifier, the output of which is applied to the previously mentioned phase detector. The phase detector compares the frequency and phase of the transmitted burst with the frequency and phase of the local oscillator and conveys a correcting D.C. voltage to the grid of the reactance tube. The reactance presented by the reactance tube is thereby varied to bring the crystal controlled oscillator in synchronism with the transmitted burst.

The output of the crystal controlled oscillator now at 3.58 megacycles is also fed into a demodulator and into a Q amplifier, the output of which feeds the Q demodulator. A double tuned transformer following the Q amplifier produces a phase change of 90° so that the carrier applied to the I and Q demodulators are of the same frequency but out of phase with respect to each other by 90°.

To disable the color portion of the receiver when a monochrome signal is received, a negative D.C. voltage developed by the previously mentioned phase detector is applied to the grid of a color killer tube. This color killer tube has applied to its plate circuit a pulsed positive D.C. obtained from the horizontal output transformer and develops a negative D.C. voltage across a resistor which voltage is used to cut off the color signal amplifier of this circuit. The above described circuit, however, utilizes at least four tubes including the color killer tube.

The novel system of the present invention on the other hand not only overcomes all the problems mentioned above but produces the same resulting signals even though essentially only a single tube is used consisting of a triode and pentode section in the same envelope and an additional tube for color killing.

One object of the present invention is, therefore, a simple and economical system for synchronizing the locally generated color carrier with a transmitter carrier.

In the present invention, the output of the burst transformer is fed into the triode section of the single envelope tube. This triode is used as a burst amplifier and in order to separate the burst signal from the rest of the horizontal synchronized signal, the cathode of this tube is gated by a negative pulse obtained from the horizontal output transformer. This serves to reduce the high cathode bias at the instant the burst is applied so that the triode section operates only over the burst signal.

The output of the burst amplifier or triode section is then applied to a crystal through a tuning capacitor. More specifically, the tuning capacitor in series with a crystal is connected to the grid of the pentode section which operates an amplifier limiter. This tube serves to amplify the output from the crystal and yields a fairly constant voltage output across the primary and secondary of the output transformer. A portion of the primary voltage is then fed into the I demodulator while the secondary voltage is fed to the Q demodulator. Since both the primary and secondary windings of this output transformer are tuned, the secondary voltage is in quadrature with respect to the primary voltage in respect to the requirements of the I and Q demodulator.

In addition to the above elements, a capacitor is used for neutralizing the grid to plate capacitance of the triode burst amplifier and a second capacitor is used for neutralizing the holder and electrode capacity of the crystal. A portion of this system is as follows. When a burst voltage is fed to the grid of the triode burst amplifier, it will appear in an amplified form across an output coil. Since this triode is keyed by a delayed negative horizontal synchronized pulse, only the burst portion of the signal appears across this coil. The series crystal is cut to a frequency of 3.579545 megacycles which is, of course, the exact frequency of the color synchronizing carrier as determined by the National Television System Committee.

It should be noted that all of the above references to the 3.58 megacycle carrier are actually to the 3.579545 megacycle carrier. The 8 or 10 cycles of burst voltage are applied to the crystal at the approximate rate of 15,750 cycles per second and cause the crystal to vibrate continuously just as a series of properly timed blows applied to a pendulum would cause it to continue its oscillation. Thus, the output voltage appearing at the grid of the pentode amplifier-limiter is practically continuous.

The series tuning capacitor is used to tune the crystal to the exact frequency of the color carrier since, as is well known, it would otherwise be extremely expensive to buy crystals ground to such close frequency tolerances.

The capacitor for neutralizing the electrode and holder capacity of the crystal prevents the burst voltage itself from appearing at the grid of the pentode amplifier-limiter while the capacitor used for neutralizing the grid to plate capacity of the triode burst amplifier serves to prevent any portion of the amplified voltage appearing at the plate circuit of the triode from feeding back into the burst transformer and thereby causing regeneration or uncontrollable changes in phase.

Accordingly, another object of the present invention is the provision of means for synchronizing a locally generated signal with a transmitted signal with the use of a single tube envelope.

Still another object of the present invention is the provision of means for gating the burst amplifier for the desired burst interval utilizing a triode tube.

A further object of the present invention is a synchronizing circuit for a color picture which yields a constant voltage output, this circuit being a part of a device utilizing only a single tube envelope.

Still another object of the present invention is the provision of means whereby the locally generated carrier is formed into two signals in quadrature with respect to each other to meet the requirements of the I and Q demodulators.

A further object of the present invention is the provision of capacitive means for preventing the burst voltage from appearing at the grid of a limiting tube utilizing the same winding used for neutralizing the triode capacity.

Still another object of the present invention is the provision of capacitive means for preventing any portion of the amplified burst voltage from being fed back into the input of the keyed triode burst amplifier to thereby cause regeneration or uncontrollable changes in phase.

It was mentioned above that an inductor is used at the output of the triode burst amplifier. This inductor consists of two windings connected in series of which the common connection of the center inductor is connected to the B+ supply. One end is connected to the plate triode section and the other end to both the crystal capacitor and the triode neutralizing capacitor. Thus, the same winding of this inductor is used for both neutralizing functions.

Another object of the present invention is the provision of a single inductor for performing the two neutralizing functions.

In order to make this novel circuit usable to receive monochrome signals, it is necessary to add a color killer tube for disabling the color portion of the television receiver when monochrome signals are being transmitted.

It was found that conventional means for disabling the color portion of a television receiver during transmission of monochrome signals did not operate properly when used in conjunction with the above mentioned novel synchronizing system. Accordingly, in the synchronizing system of the present invention, a resistor is placed in the cathode return to ground of the pentode amplifier limiter and the change in voltage across this resistor is applied to the grid of a separate triode operating as the color killer tube.

The plate of this color killer tube within a triode is fed with positive horizontal drive pulses having a rather large amplitude. Thus, a small change in the D.C. grid voltage in the pentode amplifier limiter produces a comparatively large change in the voltage between its cathode and ground, and this larger voltage generation is then applied to the grid of the color killer tube which then produces negative potentials at its plate of large amplitude which in one embodiment was 30 volts. This voltage is sufficient to cut off any other tubes in the color circuit which may be applied, in particular the color amplifiers or demodulators. It is also found desirable to apply this color killer voltage to the I and Q demodulator grids.

It should be noted, therefore, that by the use of a cathode resistor in the pentode amplifier limiter circuit, an additional voltage is obtained to operate in this case the color killer tube.

Accordingly, another object of the present invention is the provision of means for obtaining an additional voltage from the pentode amplifier-limiter to operate the color killer tube. In another form, this voltage is obtained from the cathode circuit of the pentode amplifier-limiter tube.

Still another object of the present invention is a simple circuit for disabling the color portions of a television receiver during monochrome transmission.

The foregoing and many other objects of the invention will become apparent in the following description and drawings in which.

Figures 1, 2:
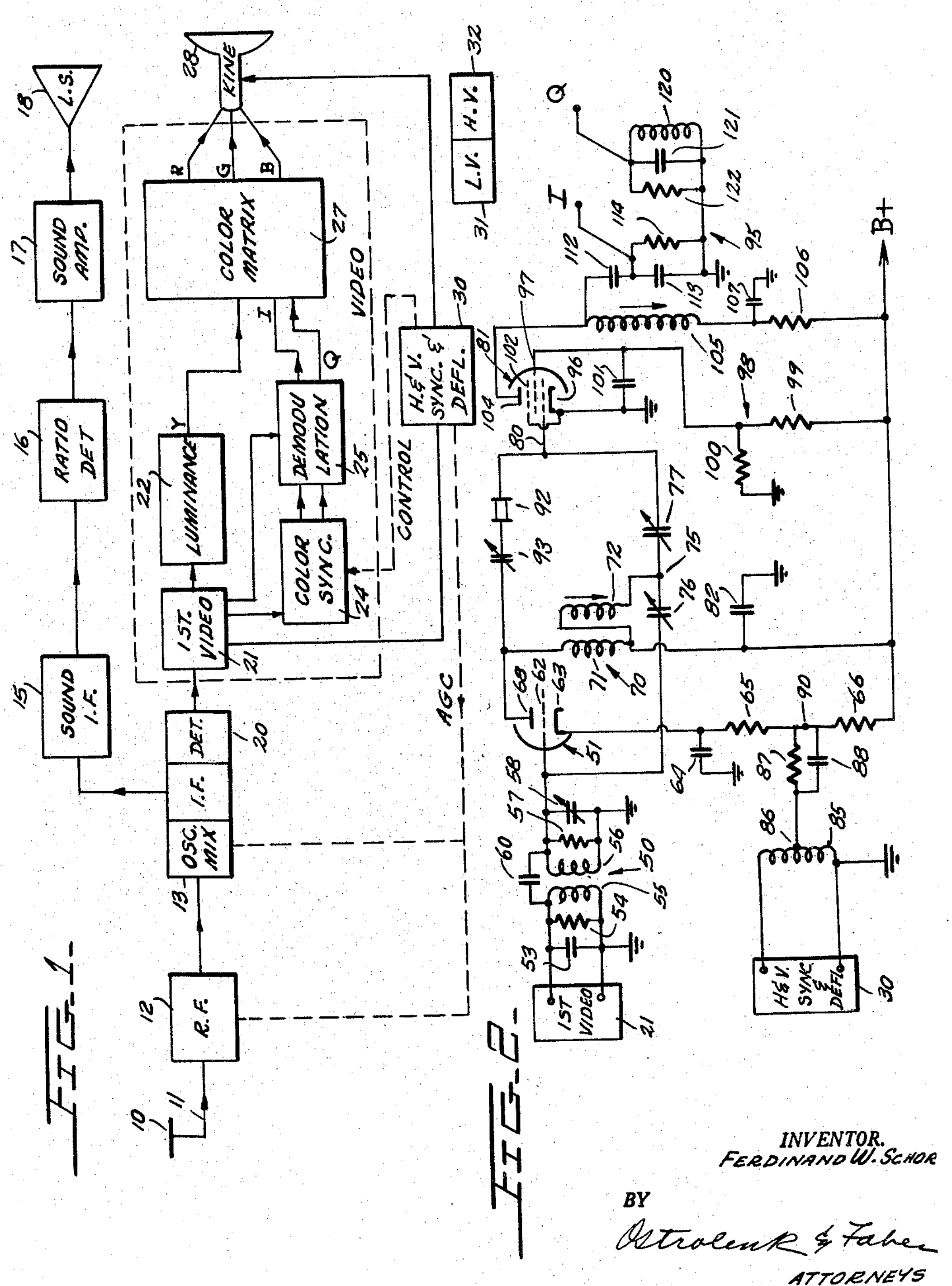
Figure 1 is a block diagram of a color television receiver.
Figure 2 is a schematic circuit diagram of the color synchronizing system of the instant invention.

Referring first to Figure 1 showing the block diagram of a color television receiver which may utilize the novel color synchronization system of the present invention, the antenna 10 is connected through a transmission line 11 to the radio frequency amplifier 12. The output from the radio frequency amplifier 12 is applied to the oscillator converter stage 13 which transforms the radio frequency signals into intermediate frequency signals. The sound intermediate frequency signal is amplified at 15 and then applied to a ratio detector 16, to a sound amplifier 17 and finally to a loud speaker 18.

The video IF is detected at 20 and then applied to a first video amplifier 21. The output from video amplifier 21 goes into a luminance channel 22, the output of which supplies the Y signal which corresponds to the black and white or brightness signal. The output from the first video amplifier is also applied to a color synchronizing circuit 24 and to a demodulating circuit 25, the function of which will be described hereinafter.

The output from the color synchronizing circuit 24 is also applied to the demodulation circuit 25. At the output of the demodulation circuit 25, there will now appear the I and Q signals, that is, the signals containing the color information. The three signals I, Y and Q are applied to the color matrix 27 so that at the output of this matrix 27 the individual color signals red, green and blue are restored and applied to the three guns of a color picture tube 28.

Horizontal and vertical synchronization in deflection circuit 30 which obtains signals from the video amplifier 21 provides signals which are applied to the color synchronization circuit 24 to the deflection plates of picture tube 28 and provides an A.G.C. voltage for the R.F. amplifier 12 and all the I.F. amplifiers as shown in the block diagram.

In addition to these blocks, a television receiver will also need power supplies, in particular a low voltage power supply 31 and a high voltage power supply 32, the low voltage supply 31 for providing a D.C. voltage to the electrode tubes used in the circuit, while the high voltage supply 32 serves for the operation of the color picture tube.

As can be seen from the block diagram of Figure 1, the color television receivers differ from the black and white television receivers by the addition of, among other circuitry, the three sections, namely, the color synchronizing circuit 24, the luminance channel 22 and the demodulation circuit 25. Actually, the luminance channel 22 corresponds to the video channel section of the black and white receiver since, as previously mentioned, it is to provide the Y or brightness signal of the color picture. The function of the luminance channel is, therefore, to amplify the luminance information at the video second detector to a value suitable for application to the matrix circuit 27 and the color picture tube.

The function of the demodulation or chrominance circuit 25 is to demodulate the color difference information from the chrominance side bands received.

The color synchronization circuit 24 has the function of exactly synchronizing, as described above, the local color oscillator through utilization of the 8 or 10 cycle burst transmitted with the color signal.

The output from the first video amplifier 21 is applied through a transformer 50 to a triode section 51 of a single envelope triode-pentode such as a 6U8. More specifically, across the output circuit of the first video amplifier 21 is connected a parallel circuit consisting of a capacitance 53, a resistance 54 and an inductance 55 of which inductance 55 is the primary winding of transformer 50.

The parallel circuit 53—54—55 is tuned to the frequency of the burst signal, that is, approximately 3.58 megacycles. The secondary winding 56 of transformer 55 is also connected in parallel with the capacitance 58 and the resistor 57. Capacitance 58 is variable to permit adjustment of the tuning of parallel circuit 56—57—58 to the burst signal frequency.

In addition to inductive coupling between windings 55 and 56, a capacitance 60 is connected between winding 55—56 to provide for additional capacitance coupling. The parallel circuit 56—57—58 is connected between the grid 62 of the triode section 51 and ground. Cathode 63 of triode section 51 is by-passed to ground by a capacitor 64 and connected through resistor 65—66 in series to the B+ supply.

The plate 68 of triode section 51 is connected to a coil 70 which actually consists of two bifilar windings 71 and 72 connected together in series, their junction points being denoted by numeral 73. More specifically, a series combination 70—72 is connected between the plate 78 of triode section 51 and the junction point 75 between two variable capacitors 76 and 77 of which capacitor 76 is connected to the grid 62 of triode section 51 while capacitor 77 is connected to the grid 80 of the pentode section 81 of the single envelope tube which, as above mentioned, could be a 6U8.

The junction point 73 of bifilar winding 70 is connected to the B+ supply and is by-passed by means of a capacitor 82. It is now obvious that triode section 51 will operate as a burst amplifier since a burst signal will be applied between the grid 62 and the cathode 63 of triode section 51 while the amplified signal will appear across inductor 70.

As is well known in the art, the burst amplifier must operate only for the duration of the burst signal. For this reason, from the output transformer 85 of the horizontal deflection circuit 30, a negative pulse is obtained by tapping at 86 of the output transformer winding 85. Connected to tap 86 is a parallel R–C network consisting of resistor 87 and capacitance 88. This parallel network is, in turn, connected to the junction point 90 between resistors 65 and 66 so that the negative pulse obtained from circuit 30 will now be applied to the cathode 63 of tube 51 to reduce the high cathode bias of triode 51 as soon as the burst signal is applied to the grid 62 of triode 51.

At the end of the burst, the bias of cathode 63 of triode 51 will have returned to its original high negative value so as to make burst amplifier 51 inoperative. The output of triode 51 is applied to a crystal 92 through a crystal tuning capacitor 93. In other words, the series circuit consisting of the crystal tuning capacitor 93 and crystal 92 is connected between plate 68 of triode section 51 and the grid 80 of the pentode section 81.

Pentode section 81 serves as an amplifier limiter in that it amplifies the output from crystal 92 and produces a fairly constant voltage output across the primary and secondary windings of its output transformer 95. More specifically, pentode 81 has its cathode 96 connected to ground.

Screen grid 97 of pentode section 81 is connected to a voltage divider 98 consisting of resistors 99 and 100 connected in series between the B+ supply and ground. By this means, the desired screen voltage can be obtained from the B+ supply. Screen grid 97 is by-passed to ground by a capacitor 101. Suppressor grid 102 is connected to cathode 96 of the pentode section 81 and, therefore, to ground.

Plate 104 of pentode 81 is connected to the B+ supply through a winding 105 in series with a dropping resistor 106. Resistor 106 is by-passed to ground by means of capacitor 107. Winding 105 is the primary winding of transformer 95. The output appearing across the primary winding 105 is passed through a frequency selective circuit 110 and then applied to the I demodulator 25. More specifically, plate 104 of pentode 81 is also connected to a capacitance 112 which in its turn is connected to a parallel circuit consisting of a capacitance 113 and resistor 114.

The other side of parallel circuit 113—114 is connected to ground. The high side of the parallel circuit 113—114 is connected to the I demodulator 25 as indicated by the capital letter I at the terminal lead of parallel circuit 113—114. The secondary winding 120 of transformer 95 is mutually coupled to the primary winding 115 and is connected across a capacitance 121 and a resistance 122 in parallel thus forming a tuned circuit connected at one end to ground and the other end to the Q demodulator 25 as indicated by the letter Q at the terminal lead of circuit 120—121—122.

Since both the primary winding 105 and the secondary winding 120 of transformer 95 are tuned, the secondary voltage is in quadrature with respect to the primary voltage so as to meet the requirements of the I and Q demodulators 25. Capacitor 76 is used in this circuit for neutralizing the grid to plate capacitance of triode amplifier 21 while capacitor 77 is used for neutralizing the holder and electrode capacity of crystal 92.

It is now possible to describe the operation of the circuit shown in Figure 2. The burst voltage from the color signal is fed to the grid 62 of triode 51 through transformer 50. Since triode 51 is keyed by a delayed negative synchronizing pulse obtained from the winding 85 only the burst portion of the television color signal appears across coil 70.

Crystal 92 is connected to a frequency of 3.579545 megacycles which is the exact frequency of the color synchronizing carrier as determined by the National Television Committee System. In fact, all the references above to 3.58 megacycles are actually to 3.579545. The 8 or 10 cycles of burst voltage are applied to crystal 92 at the rate of approximately 15,715 times per second and cause crystal 92 to vibrate continuously. Thus, the output voltage appearing at the grid 80 of pentode amplifier limiter 81 is practically continuous.

The capacitor 93 is used to tune crystal 92 to the exact frequency of the color carrier since it would be otherwise extremely expensive to buy crystals ground to such close frequency tolerances.

As previously mentioned, the capacitor 77 is used to neutralize the electrode and holding capacity of crystal 92 to prevent the burst voltage itself from appearing at the grid 80 of amplifier limiter pentode 81. Capacitor 76 is used to neutralize the grid to plate capacitance of triode 51 to prevent any portion of the amplified voltage appearing at the plate 68 of triode 51 from feeding back into the grid 62, thereby causing regeneration or uncontrollable changes in phase.

It was previously mentioned that inductance 70 consists of two bifilar windings 71 and 72 connected in series. The common connection 73 or the center of inductance 70 is connected to the B+ supply. One end is connected to the plate of the triode 51 and the other end to both capacitors 76 and 77. Thus, the same winding signal is used for both neutralizing functions.

The circuit described in connection with Figure 2 is essentially a single tube 6U8 color synchronizing circuit which converts a burst signal input I and Q suitable for demodulation at demodulator 25 of the color information appearing in the transmitted signal. It was found, however, that in order to make the circuit of Figure 2 usable also to receive monochrome, it was necessary to add a color killer tube which would disable the color portion of a color television receiver when monochrome signals are being transmitted.

Figure 3:
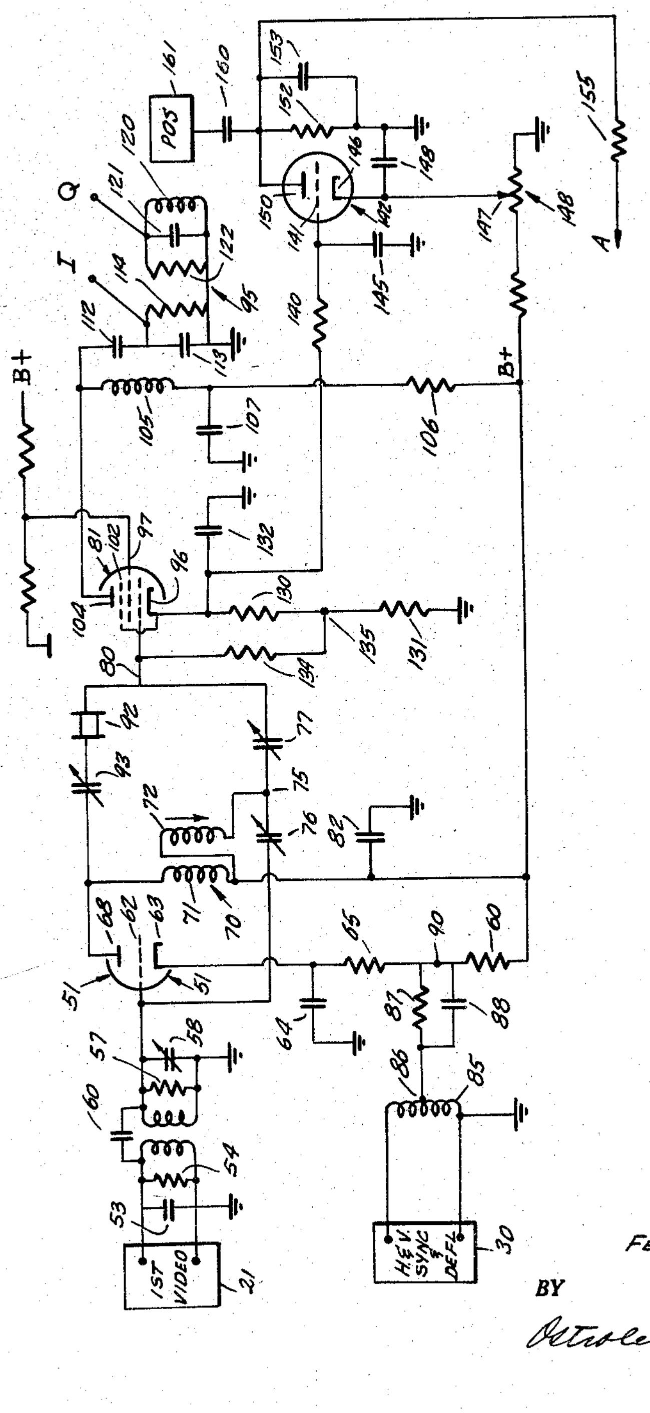
Figure 3 is a modification of the circuit of Figure 1 showing the application of a color killer tube.

The color synchronization circuit of Figure 3 is a modification of the circuit of Figure 2 to include also the color killer circuit. It will be noted, in fact, that cathode 96 of pentode amplifier limiter 81 is here connected to ground through two series resistances 130 and 131 bypassed to ground by capacitor 132.

A grid resistor 134 is connected between the grid 80 of pentode amplifier 81 and the junction point 135 between resistors 130 and 131. Also connected to cathode 96 of the pentode amplifier limiter 81 is a large series resistor 140. The other side of series resistor 140 is connected to the grid 141 of color killer tube 142.

Grid 141 of tube 142, which in this case is a triode, is connected to ground through a capacitor 145. The cathode 146 of tube 142 is connected to the tap 147 of variable resistor 148. Variable resistor 148 is connected between the B+ supply and ground. A capacitor 149 bypasses cathode 146 to ground.

Plate 150 of triode 142 is connected to ground through an R.C. parallel network consisting of resistance 152 and capacitance 153. The high side of this parallel network 152—153 is applied through a resistor 155 to the grid returns (not shown) of the I and Q demodulators 25 in a manner well known in the art.

Plate 150 of triode 142 is also connected through a capacitor 160 to a supply of positive pulses referred to by numeral 161.

In the operation of the color killer circuit shown in Figure 3, resistor 131 which is in the cathode of the return to ground has across it a voltage change which is applied to grid 141 of color killer tube 142. The plate 150 of color killer tube 142 is fed with positive horizontal drive pulses through the positive horizontal pulse supply 161. In this particular embodiment, the amplitude of these pulses is approximately 120 volts. Thus, a small change in the D.C. grid voltage of the pentode amplifier limiter 81 produces a comparatively large change in the voltage between its plate 104 and ground, and this larger voltage variation through resistor 131 is then applied to the grid 141 of tube 142 which then produces negative potentials at its plate 150 of the order of 30 volts in this particular embodiment. This voltage is certainly more than sufficient to cut off any of the tubes in the color circuit in which it may be applied.

In the case of the circuit shown in Figure 2, it is desirable to apply this voltage to the grids of the I and Q demodulators shown in the block diagram referred to by numeral 25.

From the above, it should now be clearly understood that one of the basic features of the present invention is in the use of cathode resistor 131 to provide additional voltage for the operation of color killer tube 142.

In an actual physical embodiment of the present invention the following components and components' values were used:

| | | |
|---|---|---|
| Capacitor 64 | mf | .01 |
| Tube 51—81 | | 6U8 |
| Resistor 65 | ohms | 220 |
| Resistor 66 | | 220K |
| Resistor 87 | | 12K |
| Capacitor 88 | mf | 2 |
| Capacitor 82 | mf | .01 |
| Capacitor 101 | mf | .01 |
| Capacitor 112 | mmf | 10 |
| Capacitor 113 | mmf | 150 |
| Resistor 114 | ohms | 680 |
| Capacitor 121 | mmf | 150 |
| Resistor 122 | ohms | 680 |
| B+ | v | 300 |
| Resistor 131 | | 10K |
| Capacitor 132 | mf | .01 |
| Resistor 140 | m | 2.2 |
| Capacitor 145 | mf | .01 |
| Capacitor 149 | mf | 0.1 |
| Resistor 152 | | 100K |
| Capacitor 153 | mmf | 400 |
| Capacitor 160 | mmf | 120 |
| Resistor 155 | | 220K |

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. In a television receiver, a color synchronization circuit for synchronizing the local color sub-carrier with the transmitted color sub-carrier, said circuit comprising an amplifier having an input circuit tuned to the frequency of the incoming synchronizing signal, an impedance in the output circuit of said amplifying tube element, a series circuit comprising a high Q frequency determining element and a tuning means, a pentode amplifier-limiter stage, said series circuit being connected between the output of said first amplifier and the input of said amplifier-limiter stage and tuned impedance means in the output circuit of said amplifier-limiter stage for providing two output signals of the same frequency and of a predetermined phase relation.

2. In a television receiver, a color synchronization circuit for accurately synchronizing the local color sub-carrier with the frequency of the transmitted color sub-carrier, said synchronization circuit comprising a tuned amplifier, frequency determining means, an amplifier-limiter, said frequency determining means being connected between the output of said first amplifier and the input of said amplifier-limiter, parallel tuned primary and secondary windings in the output of said amplifier-limiter and means for deriving from said tuned windings the I and Q demodulating signals.

3. In a television receiver, a color synchronization circuit for accurately synchronizing the local color sub-carrier with the frequency of the transmitted color sub-carrier, said synchronization circuit comprising a tuned amplifier frequency determining means, an amplifier-limiter, said frequency determining means being connected between the output of said first amplifier and the input of said amplifier-limiter, parallel tuned primary and secondary windings in the output of said amplifier-limiter and means for deriving from said tuned windings the I and Q demodulating signals, capacitive means for neutralizing the plate to grid capacitance of said first amplifier.

4. In a television receiver, a color synchronization circuit for accurately synchronizing the local color sub-carrier with the frequency of the transmitted color signal sub-carrier, said synchronization circuit comprising a tuned amplifier crystal frequency determining means, an amplifier-limiter, said frequency determining means being connected between the output of said first amplifier and the input of said amplifier-limiter, parallel tuned primary and secondary windings in the output of said amplifier-limiter, and means for deriving from said tuned windings the I and Q demodulating signals, capacitive means for neutralizing the plate to grid capacitance of said first amplifier, and second capacitive means being connected between said first capacitive means and the input of said amplifier-limiter stage for neutralizing the crystal capacitances.

5. In a television receiver, a color synchronization circuit comprising a first tuned amplifier stage, a balanced center tapped inductor being connected in the output circuit of said amplifier, a frequency determining circuit and an amplifier-limiter stage, said frequency determining circuit comprising a frequency determining crystal and a fine tuning capacitor in series, said frequency determining circuit being connected between the output of said first amplifier and the input of said amplifier-limiter, a neutralizing means connected between the input of said first amplifier and the one end of said inductor for neutralizing the output capacitances of said first amplifier, second neutralizing means connected between the input of said amplifier-limiter and one end of said inductor for neutralizing the capacitances of said crystal, frequency selective means in the output of said amplifier-limiter for deriving demodulating signals in predetermined phase relation.

6. In a television receiver, a color synchronization circuit comprising a first tuned amplifier stage, a bifilar inductor being connected in the output circuit of said amplifier, a frequency determining circuit and an amplifier-limiter stage, said frequency determining circuit comprising a frequency determining crystal and a tuning capacitor in series, said frequency determining circuit being connected between the output of said first amplifier and the input of said amplifier-limiter, a neutralizing means connected between the input of said first amplifier and one end of said inductor for neutralizing the output capacitances of said first amplifier, second neutralizing means connected between the input of said amplifier-limiter and one end of said inductor for neutralizing the capacitances of said crystal, frequency selective means in the output of said amplifier-limiter for deriving demodulating signals in predetermined phase relation, said amplifier-limiter stage comprising a pentode, a resistor being connected between the cathode of said pentode and ground, a color killer tube for rendering inoperative the color circuits in the television receiver during monochrome transmission, means connected between the cathode of said pentode and the input of said color killer tube for causing said color killer tube to render inoperative the active elements in the said color synchronization circuit.

7. In a television receiver, a color synchronization circuit for synchronizing the local color sub-carrier with the transmitted color sub-carrier, said circuit comprising an amplifier having an input circuit tuned to the frequency of the incoming color burst signal, an impedance in the output circuit of said amplifying tube, a series circuit comprising a high Q frequency determining circuit and a means of changing said frequency, a second amplifier tube, said series circuit being connected between the output of said first amplifier and the input of said second amplifier tube, impedance means in the output circuit of said second amplifier tube, for providing two output signals of the same frequency and of a predetermined phase, and means for making said first amplifier operative during the synchronizing portion of the transmitted color signal.

8. In a television receiver, a color synchronization circuit for synchronizing the local color sub-carrier with the transmitted color sub-carrier, said circuit comprising an amplifier having an input circuit tuned to the frequency of the incoming color burst signal, an impedance in the output circuit of said amplifying tube, a series circuit comprising a high Q frequency determining circuit and a means of changing said frequency, a second amplifier tube, said series circuit being connected between the output of said first amplifier and the input of said second amplifier tube, an impedance means in the output circuit of said second amplifier tube for providing two output signals of the same frequency and of a predetermined phase, and means for making said first amplifier operative during the synchronizing portion of the transmitted color signal, said means being connected to the cathode of said first amplifier tube.

9. In a television receiver, a color synchronization circuit for accurately synchronizing the local color sub-carrier with the frequency of the transmitted color sub-carrier, said synchronization circuit comprising a tuned amplifier, frequency determining means, an amplifier-limiter, said frequency determining means being connected between the output of said first amplifier and the input of said amplifier-limiter, parallel tuned primary and secondary windings in the output of said amplifier-limiter and means for deriving from said tuned windings two signals of the same frequency and of a predetermined phase relation.

References Cited in the file of this patent

UNITED STATES PATENTS

| | | |
|---|---|---|
| 2,681,379 | Schroeder | June 15, 1954 |
| 2,736,765 | Lohman | Feb. 28, 1956 |
| 2,744,155 | Kihn | May 1, 1956 |
| 2,766,321 | Parker | Oct. 9, 1956 |

OTHER REFERENCES

Color TV, Rider Pub., March 1954, pages 141, 142.

Introduction to Color Television, Admiral Corp., February 1954, pages 17 to 27.